No. 785,299. PATENTED MAR. 21, 1905.
I. FOX.
EYEGLASS MOUNTING.
APPLICATION FILED NOV. 16, 1904.
FIG. I.
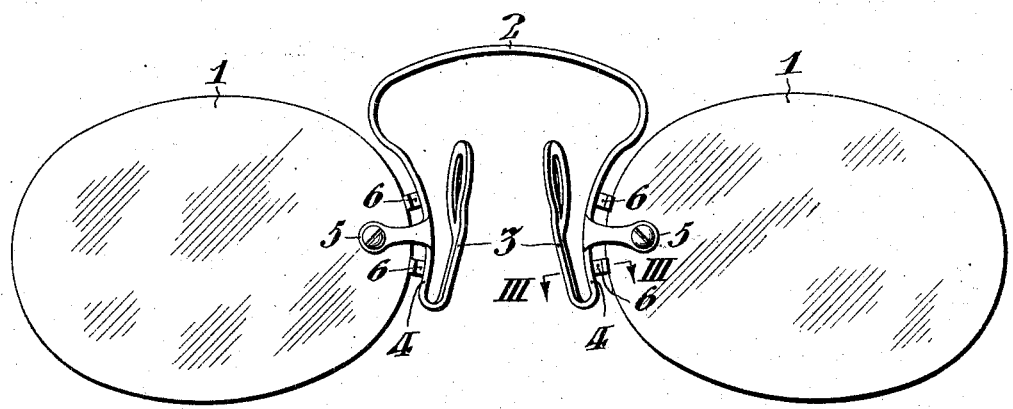
FIG. II.
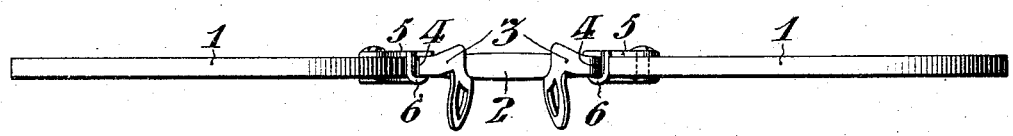
FIG. III.
WITNESSES:
Arthur E. Paige
Thos. K. Lancaster
INVENTOR:
Ivan Fox
By his Attorney:
Wm. C. Strawbridge No. 785,299. Patented March 21, 1905.

UNITED STATES PATENT OFFICE.

IVAN FOX, OF PHILADELPHIA, PENNSYLVANIA, ASSIGNOR TO FOX OPTICAL MANUFACTURING COMPANY, OF PHILADELPHIA, PENNSYLVANIA, A CORPORATION OF NEW JERSEY.

EYEGLASS-MOUNTING.

SPECIFICATION forming part of Letters Patent No. 785,299, dated March 21, 1905.

Application filed November 16, 1904. Serial No. 232,933.

*To all whom it may concern:*

Be it known that I, IVAN FOX, a citizen of the United States, residing in the city and county of Philadelphia, State of Pennsylvania, have invented certain new and useful Improvements in Eyeglass-Mountings, of which the following is a specification.

My invention relates to an improvement in eye glass mountings, and, specifically considered, it relates to an eye glass mounting in which the nose piece or nose guard and the bow spring of the mounting consist of an integral piece of material.

My invention has for its object to provide means whereby the portion of the mounting connective of the bow spring proper and the guard may be separated or spaced a greater or less distance from the edges of the lenses of a pair of eye glasses.

In the accompanying drawings, I illustrate a good form of embodiment of my invention, but it will be understood that variations in construction and arrangement may be employed without departing from the spirit of my invention.

In the accompanying drawings forming a part of this specification,—

Figure I is a front elevation of a pair of eye glasses provided with my improved mounting;

Figure II is a bottom plan view of a pair of eye glasses provided with my improved mounting; and Figure III is a section on the line III-III of Figure I.

Referring to the drawings,—

1 designates the lenses of a pair of eye glasses and 2 designates the bow spring which connects the said lenses. The nose pieces or nose guards are formed integral with the bow spring, and each of the said nose pieces or nose guards consists of the portion 3, which is adapted to rest upon the nose of the wearer, and of the part which I term the basal leg portion 4, which, as is clearly shown in the drawings, is a continuation or extension of an end of the bow spring.

As illustrated, the nose pieces or nose guards have the same construction as the nose guard forming the subject-matter of my Patent No. 695,681, dated March 18, 1902. It is to be understood, however, that a guard of any other suitable construction may be employed.

5 designates posts or standards which are connective of the eye glass lenses and the opposite ends of the bow spring. As illustrated, these posts or standards consist of strips or projections integral with the strip forming the bow spring and nose pieces or nose guards, the said projections being bent so as to occupy positions upon opposite sides of the lenses and to clasp the same. I desire it to be understood, however, that these posts or standards may be constructed in any other suitable manner. For instance, they may consist of separate pieces of material secured in any manner desired to the opposite ends of the bow spring.

6 designates U-shape springs located upon opposite sides of the posts or standards 5, and between the opposite ends of the bow spring and the lenses and between the extensions 4 and the lenses. These U-shape springs are integral with the mounting and consist of projecting strips which are bent into the U-shape shown. It is to be understood that the contour or shape of these springs may be varied without departing from my invention.

By providing the springs 6, I am enabled to locate the opposite ends of the bow spring and the portions 4 of the nose pieces or nose guards some distance away from the edges of the eye glass lenses, in consequence of which the lenses and the bow spring may be arranged in the same plane.

In securing the mounting to a pair of eye glass lenses, the springs 6 should be placed slightly under tension so that when the mounting is held and pressure is exerted upon one or the other of the lenses in the direction of its plane, the said lens would not become disengaged from or move out of contact with either one of the said springs.

If, on the other hand, a lens should be held and pressure exerted upon the mounting in the direction of the plane of the lens, the lens would not be moved out of contact with either one of the springs 6.

The broad subject-matter disclosed but not claimed in this application is claimed in my co-pending application, Serial No. 238,351, filed December 27, 1904.

Having thus described my invention, I claim—

1. As an article of manufacture, an eye glass mounting comprising a bow spring and nose guards, the said guards being integral with the said bow spring, posts or standards connected to the said bow spring, and U-shaped springs integral with the said mounting and located upon opposite sides of the said posts or standards.

2. As an article of manufacture, an eye glass mounting comprising a bow spring and nose guards, the said guards being integral with the said bow spring, posts or standards connected to the said bow spring, and springs formed integral with the said mounting and located upon opposite sides of the said posts or standards.

3. In eye glasses, the combination of the lenses and a one piece eye glass mounting consisting of a bow spring, nose pieces or nose guards, posts or standards connective of the lenses and the bow spring, and U-shaped springs located upon opposite sides of the said posts or standards and adapted to contact with the said lenses.

4. In eye glasses, the combination of the lenses with an eye glass mounting, the said mounting comprising a bow spring, nose pieces, the said bow spring and nose pieces being integral, posts or standards secured to the opposite ends of the bow spring and connecting the same to the lenses, and bent springs connected to the bow spring and nose pieces upon opposite sides of the said posts or standards, the said springs being located between the ends of the bow spring and nose pieces and the eye glass lenses.

In testimony that I claim the foregoing as my invention I have hereunto signed my name this 14th day of November, A. D. 1904.

IVAN FOX.

In presence of—
LAURA KLEINFELDER,
THOS. K. LANCASTER.